(12) United States Patent
Watanabe

(10) Patent No.: US 11,917,705 B2
(45) Date of Patent: Feb. 27, 2024

(54) COMMUNICATION APPARATUS THAT COMMUNICATES WITH OTHER DEVICES VIA NETWORK, CONTROL METHOD, AND STORAGE MEDIUM

(71) Applicant: CANON KABUSHIKI KAISHA, Tokyo (JP)

(72) Inventor: Kenta Watanabe, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 144 days.

(21) Appl. No.: 17/723,115

(22) Filed: Apr. 18, 2022

(65) Prior Publication Data
US 2022/0346164 A1 Oct. 27, 2022

(30) Foreign Application Priority Data
Apr. 27, 2021 (JP) ................................. 2021-074968

(51) Int. Cl.
*H04W 76/15* (2018.01)
*H04W 4/80* (2018.01)
*H04W 76/30* (2018.01)

(52) U.S. Cl.
CPC ............ *H04W 76/15* (2018.02); *H04W 4/80* (2018.02); *H04W 76/30* (2018.02)

(58) Field of Classification Search
CPC ........ H04W 76/15; H04W 76/30; H04W 4/80
See application file for complete search history.

(56) References Cited

U.S. PATENT DOCUMENTS

| | | | |
|---|---|---|---|
| 2018/0007499 A1* | 1/2018 | Lee | H04W 76/10 |
| 2018/0152891 A1* | 5/2018 | Xie | H04W 52/0235 |
| 2019/0289166 A1* | 9/2019 | Harada | H04N 1/00095 |
| 2021/0191674 A1* | 6/2021 | Hada | H04N 1/32765 |
| 2021/0282208 A1* | 9/2021 | Hanada | H04W 76/15 |

FOREIGN PATENT DOCUMENTS

JP  2019161507 A  9/2019

* cited by examiner

*Primary Examiner* — David Bilodeau
(74) *Attorney, Agent, or Firm* — Canon U.S.A., Inc. IP Division

(57) ABSTRACT

An information processing apparatus includes a first wireless communication unit that performs wireless communication with a plurality of communication apparatuses simultaneously, a second wireless communication unit that performs wireless communication with one of the plurality of communication apparatuses selectively, a control unit that controls establishment of a wireless connection with one of the plurality of communication apparatuses via the second wireless communication unit based on information shared via the first wireless communication unit, and a transmission unit that transmits, in a case a request to establish a wireless connection via the second wireless communication unit is received from one of the plurality of communication apparatuses, a notification indicating that a connection via the second wireless communication unit is not allowed to a communication apparatus that has a wireless connection to the information processing apparatus via the first wireless communication unit, and is not a transmitter of the request.

20 Claims, 8 Drawing Sheets

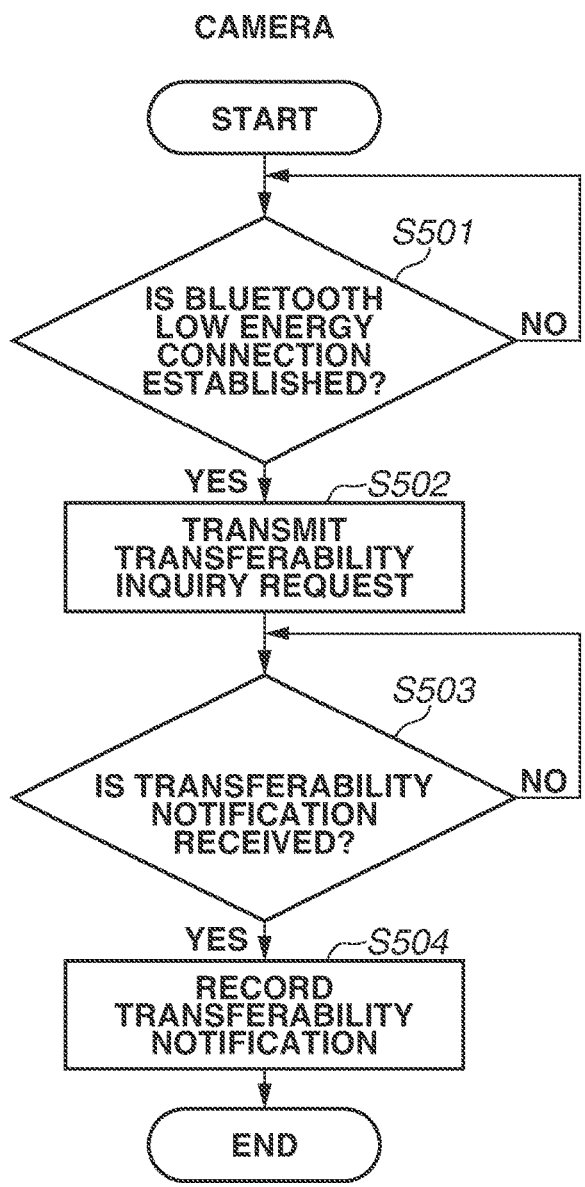
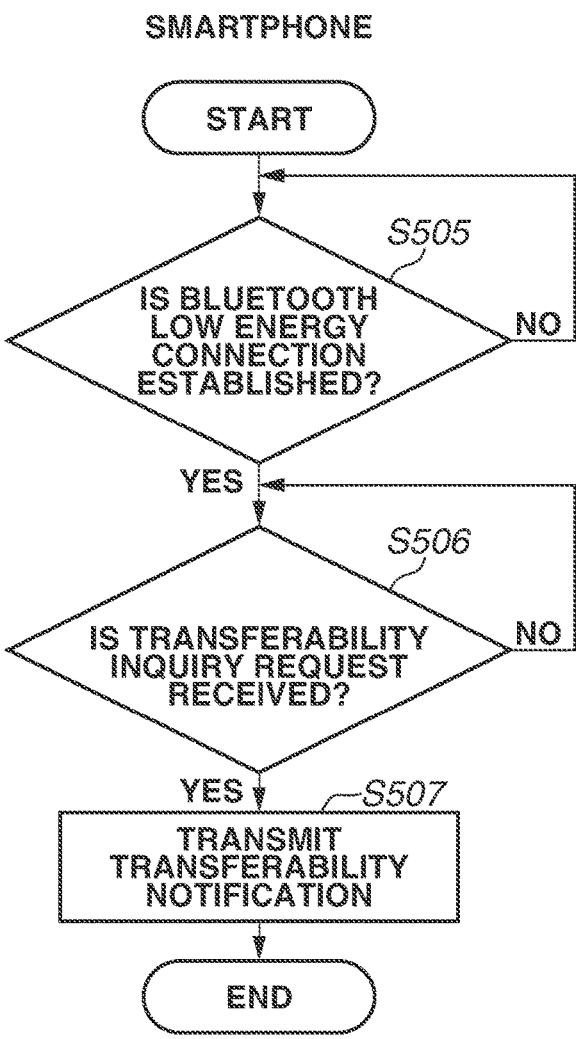

COMMUNICATION APPARATUS THAT COMMUNICATES WITH OTHER DEVICES VIA NETWORK, CONTROL METHOD, AND STORAGE MEDIUM

BACKGROUND

Field

The present disclosure relates to a communication apparatus that communicates with other devices via a network.

Description of the Related Art

Communication apparatuses capable of performing communication based on a plurality of communication standards have been available in recent years. For example, digital cameras capable of performing communication compliant with Bluetooth® Low Energy and communication compliant with Bluetooth Classic are available. Communication compliant with Bluetooth Classic can realize faster wireless communication than communication compliant with Bluetooth Low Energy.

Japanese Patent Application Laid-Open No. 2019-161507 discusses a technique in which a digital camera and a smartphone can establish both of a wireless connection compliant with the Bluetooth Low Energy communication standards and a wireless connection compliant with the Bluetooth Classic standards.

In Bluetooth communication, an apparatus as a leader such as a smartphone can connect to a plurality of apparatuses as followers such as digital cameras. Meanwhile, a communicable range of Bluetooth communication is limited. Thus, a smartphone may be designed to communicate with a plurality of digital cameras for transmitting and receiving data in a case where high communication speed is not requested and communicate with a single digital camera for transmitting and receiving data in a case where high communication speed is requested. For example, a smartphone establishes a Bluetooth Low Energy connection with a plurality of digital cameras, and in a case where image data is to be received from one digital camera, a handover from Bluetooth Low Energy communication to Bluetooth Classic communication, which is faster, is performed only with the one digital camera.

However, in a case where the plurality of digital cameras having a Bluetooth Low Energy connection to the smartphone transmits a handover request at nearly the same time, at least one of the digital cameras fails to perform a handover with the smartphone. Thus, there is a possibility that handover processing fails in a case where a plurality of digital cameras has a wireless connection to a smartphone.

SUMMARY

According to various embodiments of the present disclosure, an information processing apparatus includes a first wireless communication unit configured to perform wireless communication with a plurality of communication apparatuses simultaneously, a second wireless communication unit configured to perform wireless communication with one of the plurality of communication apparatuses selectively, a control unit configured to control establishment of a wireless connection with one of the plurality of communication apparatuses via the second wireless communication unit based on information shared via the first wireless communication unit, and a transmission unit configured to transmit, in a case a request to establish a wireless connection via the second wireless communication unit is received from one of the plurality of communication apparatuses, a notification to a communication apparatus that has a wireless connection to the information processing apparatus via the first wireless communication unit, and is not a transmitter of the request so that the communication apparatus receiving the notification recognizes that a connection via the second wireless communication unit is not allowed.

Further features of the present disclosure will become apparent from the following description of example embodiments with reference to the attached drawings.

BRIEF DESCRIPTION OF THE DRAWINGS

FIGS. 5A and 5B are flowcharts illustrating a transferability control process performed by the imaging apparatus and the communication apparatus according to the example embodiment of the present disclosure.

DESCRIPTION OF THE EMBODIMENTS

Various example embodiments of the present disclosure will be described below with reference to the attached drawings.

It should be noted that the example embodiments described below are mere examples and can be modified or changed as needed without departing from the scope of the invention, depending on a configuration of an apparatus to which the present disclosure is applied and various other conditions. Further, the example embodiments can be combined as needed.

Configuration of Digital Camera

Figure 1A:
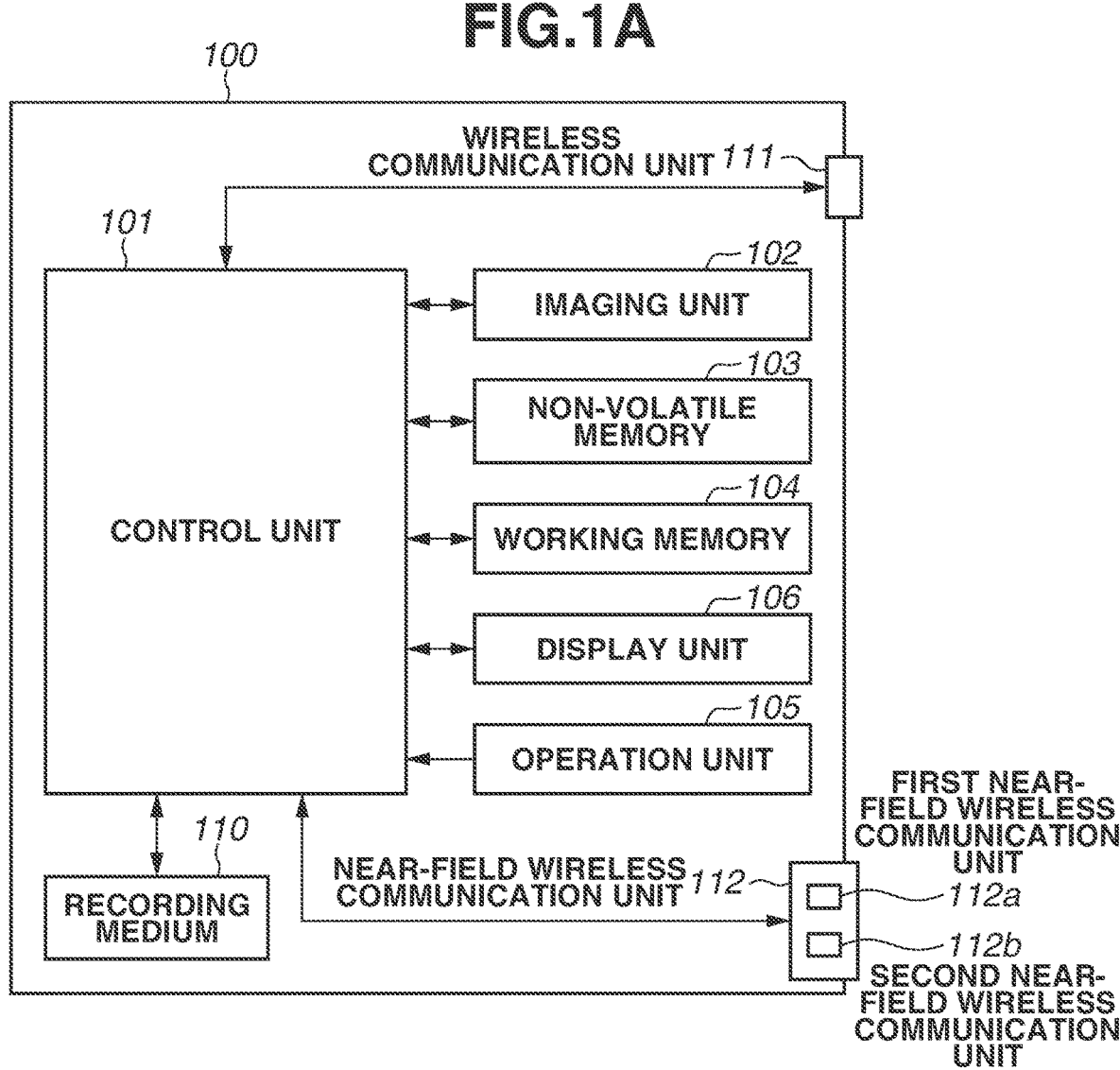
FIGS. 1A, 1B, and 1C are block diagrams illustrating an example of a hardware configuration of an imaging apparatus according to an example embodiment of the present disclosure.

FIG. 1A is a block diagram illustrating an example of a configuration of a digital camera 100 as an example of a communication apparatus according to the present example embodiment. While the digital camera 100 is described herein as an example of the communication apparatus according to the present example embodiment, the communication apparatus is not limited to a digital camera. Other examples of the communication apparatus include a mobile media player and an information processing apparatus such as a tablet device and a personal computer.

A control unit 101 includes a processor configured to control components of the digital camera 100 based on input signals and a program described below. In place of the control unit 101 controlling the entire apparatus, a plurality of pieces of hardware can control the entire apparatus by sharing processing.

An imaging unit 102 includes, for example, an optical lens unit, an optical system that controls an aperture, zoom and focus, and an image sensor that converts light (video image) guided through the optical lens unit into electric video signals. A complementary metal oxide semiconductor (CMOS) image sensor or a charge coupled device (CCD) image sensor is generally used as the image sensor. The imaging unit 102 is controlled by the control unit 101 to convert subject light formed by lenses of the imaging unit 102 into electric signals using the image sensor, perform noise reduction processing on the signals, and output digital data as image data. The digital camera 100 according to the present example embodiment records the image data into a recording medium 110 in conformity with Design rule for Camera File system (DCF) standards.

A non-volatile memory 103 is an electrically erasable and recordable non-volatile memory and stores below-described programs to be executed by the control unit 101.

A working memory 104 is used as a buffer memory for temporarily storing image data captured by the imaging unit 102, a memory for images to be displayed on a display unit 106, and a working area of the control unit 101.

An operation unit 105 is used to receive user instructions that a user issues to the digital camera 100. The operation unit 105 includes, for example, a power button, a release switch, and a reproduction button. A user uses the power button to issue an instruction to turn on/off the digital camera 100, uses the release switch to issue an instruction to capture an image, or uses the reproduction button to issue an instruction to reproduce image data. The operation unit 105 further includes operational members such as a dedicated connection button for starting communication with an external device via a wireless communication unit 111 described below. A below-described touch panel formed on the display unit 106 is also included in the operation unit 105. The release switch includes switches SW1 and SW2. When the release switch is half-pressed, the switch SW1 is turned on. When the switch SW1 is turned on, an instruction to prepare for image capturing, such as autofocus (AF) processing, auto exposure (AE) processing, auto white balance (AWB) processing, and electronic flash pre-emission (EF) processing, is received. Further, the switch SW2 is turned on by changing the release switch to a full-pressed state. When the switch SW2 is turned on, an instruction to capture an image is received.

The display unit 106 displays a viewfinder image during image capturing, displays captured image data, and displays text for interactive operations. The display unit 106 does not necessarily have to be built in the digital camera 100. The digital camera 100 can have other configurations as long as the digital camera 100 is at least connectable to an internal or external display unit 106 and has a display control function of controlling displays on the display unit 106.

The recording medium 110 can record image data output from the imaging unit 102.

The recording medium 110 can be configured to be attachable to and detachable from the digital camera 100 or can be built in the digital camera 100. Specifically, the digital camera 100 can be configured in any manner as long as the digital camera 100 includes at least a unit for accessing the recording medium 110.

The wireless communication unit 111 is an interface for connecting to external apparatuses. The digital camera 100 according to the present example embodiment can transmit and receive data to and from external apparatuses via the wireless communication unit 111. Examples of the external apparatuses includes an information processing apparatus capable of performing wireless communication, such as a smartphone and a personal computer. For example, image data generated by the imaging unit 102 can be transmitted to an external apparatus via the wireless communication unit 111. The wireless communication unit 111 according to the present example embodiment includes an interface for communicating with external apparatuses using a wireless local area network (wireless LAN) in conformity with the Institute of Electrical and Electronics Engineers (IEEE) 802.11 communication standards. Hereinafter, wireless communication based on the IEEE 802.11 communication standards will be referred to as "wireless LAN communication". The control unit 101 realizes wireless communication with external apparatuses by controlling the wireless communication unit 111.

The wireless communication unit 111 of the digital camera 100 according to the present example embodiment has an access point (AP) mode and a client (CL) mode. The wireless communication unit 111 operates as an access point in an infrastructure mode in the AP mode or operates as a client in the infrastructure mode in the CL mode. With the wireless communication unit 111 operating in the CL mode, the digital camera 100 according to the present example embodiment can operate as a CL device in the infrastructure mode. In a case where the digital camera 100 operates as a CL device, the digital camera 100 can connect to a nearby AP device and join a network formed by the AP device.

Further, with the wireless communication unit 111 operating in the AP mode, the digital camera 100 according to the present example embodiment can operate as a simplified AP (hereinafter, "simple AP") that is a type of AP but has limited functions.

When the digital camera 100 operates as a simple AP, the digital camera 100 forms a network by itself. An apparatus near the digital camera 100 recognizes the digital camera 100 as an AP device and can join the network formed by the digital camera 100. Further, the AP mode and the CL mode can be switched by performing determination based on information written by a communication apparatus 200 using near-field wireless communication via a near-field wireless communication unit 112.

The near-field wireless communication unit 112 is an interface for wirelessly communicating with external apparatuses.

The near-field wireless communication unit 112 includes, for example, an antenna, a modulation/demodulation circuit for processing wireless signals, and a communication controller. Examples of the external apparatuses include an information processing apparatus capable of performing wireless communication, such as a smartphone and a personal computer. The near-field wireless communication unit 112 outputs modulated wireless signals from the antenna and demodulates wireless signals received by the antenna to realize near-field wireless communication according to Bluetooth® communication standards. Hereinafter, wireless communication compliant with Bluetooth communication standards will be referred to as "Bluetooth communication". The near-field wireless communication unit 112 according to the present example embodiment includes a first near-field wireless communication unit 112a and a second near-field wireless communication unit 112b. Communication via the first near-field wireless communication unit 112a is Bluetooth communication compliant with Bluetooth Low Energy. Further, communication via the second near-field wireless communication unit 112b is Bluetooth communication compliant with Bluetooth Classic. Hereinafter, Bluetooth communication compliant with Bluetooth Low Energy will be referred to as "Bluetooth Low Energy communication" and Bluetooth communication compliant with Bluetooth Classic as "Bluetooth Classic communication". Bluetooth Low Energy and Bluetooth Classic are both standards defined in the Bluetooth specifications but have no compatibility with each other.

Bluetooth communication will be described below. A connection form of Bluetooth communication is a star network using a leader-follower scheme. According to the present example embodiment, the communication apparatus 200 is a communication apparatus operating as a leader (hereinafter, referred to as "leader apparatus") and the digital camera 100 is a communication apparatus operating as a follower (hereinafter, referred to as "follower apparatus"). A leader apparatus manages participation of a follower apparatus in the network and sets various parameters for wireless connection with a follower apparatus. A leader apparatus can simultaneously connect to a plurality of follower apparatuses whereas a follower apparatus can only establish a wireless connection selectively with a single leader apparatus and cannot simultaneously connect to a plurality of leader apparatuses. Further, leader apparatuses cannot establish a wireless connection with each other, and follower apparatuses cannot establish a wireless connection with each other. One of the apparatuses needs to operate as a leader apparatus and the other as a follower apparatus in order to establish a wireless connection between the apparatuses.

According to the present example embodiment, the digital camera 100 is paired with the communication apparatus 200 described below and records connection information about the communication apparatus 200 in the non-volatile memory 103. The pairing is a process by which a leader apparatus and a follower apparatus register (record in a predetermined area) connection information about each other. Examples of connection information include an encryption key and a media access control (MAC) address. According to the present example embodiment, the pairing is determined to be completed when the digital camera 100 and the communication apparatus 200 register connection information about each other and thereafter the digital camera 100 establishes a wireless connection with the communication apparatus 200. The paired state is maintained even if the established connection is disconnected. Specifically, the concept of pairing refers to not a state of being connected but a state where the leader apparatus and the follower apparatus register the connection information about each other.

The digital camera 100 can transmit and receive data having a relatively small volume, such as time information and Global Positioning System (GPS) coordinate information, to and from external apparatuses via Bluetooth Low Energy communication. On the other hand, the digital camera 100 can transmit and receive data having a relatively large volume, such as image data and moving image data, via Bluetooth Classic communication. Further, Bluetooth Low Energy communication is generally lower in power consumption than Bluetooth Classic communication. On the other hand, Bluetooth Classic communication is generally higher in communication speed than Bluetooth Low Energy communication. The digital camera 100 according to the present example embodiment can stay connected to the communication apparatus 200 using Bluetooth Low Energy. The Bluetooth Low Energy communication can be switched to Bluetooth Classic communication automatically by an operation from the digital camera 100 or the communication apparatus 200.

Bluetooth communication is narrower in communicable range (i.e., shorter in communicable distance) than wireless LAN communication. Further, Bluetooth communication is lower in communication speed than wireless LAN communication. In other words, wireless LAN communication is higher in communication speed than Bluetooth communication. On the other hand, Bluetooth communication is lower in power consumption than wireless LAN communication.

Although the digital camera 100 according to the present example embodiment is a type of AP, since the digital camera 100 is a simple AP without a gateway function of transferring data received from a CL device to an Internet provider, the digital camera 100 cannot transfer data received from another apparatus having joined the network formed by the digital camera 100 to another network such as the Internet.

Figure 1B:
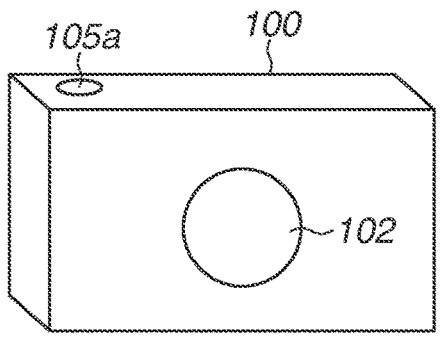
Figure 1C:
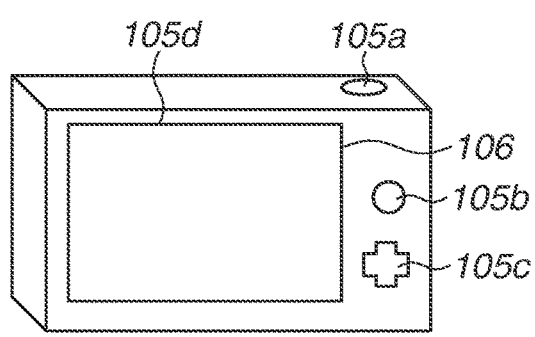

Next, an external view of the digital camera 100 will be described below. FIG. 1B is a perspective view illustrating a front side (lens side) of the digital camera 100, and FIG. 1C is a perspective view illustrating a rear side of the digital camera 100. A release button 105a, a reproduction button 105b, a direction key 105c, a touch panel 105d, and a power lever (not illustrated) in FIGS. 1B and 1C are operational members of the operation unit 105. Further, the display unit 106 displays images captured as a result of imaging by the imaging unit 102 and various menus.

A configuration of the digital camera 100 has been described above.

Configuration of Information Processing Apparatus

Figure 2:
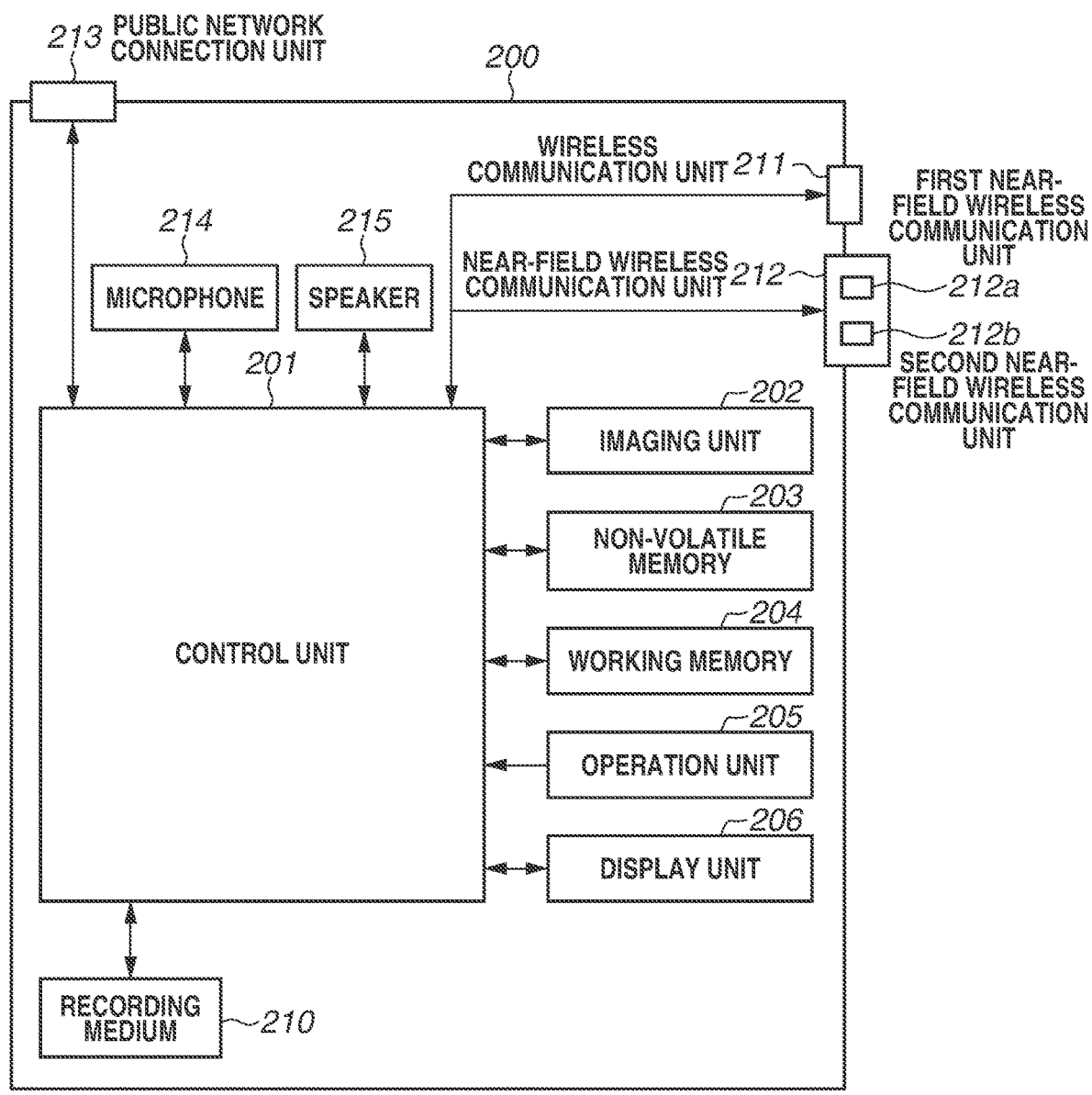
FIG. 2 is block diagrams illustrating an example of a hardware configuration of a communication apparatus according to the example embodiment of the present disclosure.

FIG. 2 is a block diagram illustrating an example of a configuration of the communication apparatus 200 as an example of an information processing apparatus according to the present example embodiment. While the communication apparatus 200 is described herein as an example of the information processing apparatus according to the present example embodiment, the information processing apparatus is not limited to a communication apparatus. Other examples of the information processing apparatus includes a smartphone, a digital camera having a wireless function, a tablet device, and a personal computer.

A control unit 201 includes a processor configured to control components of the communication apparatus 200 based on input signals and a program described below. In place of the control unit 201 controlling the entire apparatus, a plurality of pieces of hardware can control the entire apparatus by sharing processing.

An imaging unit 202 converts subject light formed by lenses of the imaging unit 202 into electric signals, performs noise reduction processing on the signals, and outputs digital data as image data. Captured image data is first stored in a buffer memory, and then the control unit 201 performs predetermined computation on the image data and records the resulting data in a recording medium 210.

A non-volatile memory 203 is an electrically erasable and recordable non-volatile memory. An operating system (OS) that is basic software to be executed by the control unit 201 and an application that realizes an applied function in cooperation with the OS are recorded in the non-volatile memory 203. Further, the non-volatile memory 203 stores an application for communicating with the digital camera 100 according to the present example embodiment.

A working memory 204 is used as a memory for images to be displayed on a display unit 206 and as a working area of the control unit 201.

An operation unit 205 is used to receive instructions that a user issues to the communication apparatus 200. The operation unit 205 includes operational members such as a power button that a user uses to turn on/off the communication apparatus 200 and a touch panel formed on the display unit 206.

The display unit 206 displays image data and displays text for interactive operations. The display unit 206 does not necessarily need to be included in the communication apparatus 200 if the communication apparatus 200 is connectable to the display unit 206 and has a display control function of controlling displays on the display unit 206.

The recording medium 210 can record image data output from the imaging unit 202.

The recording medium 210 can be configured to be attachable to and detachable from the communication apparatus 200 or can be built in the communication apparatus 200. Specifically, the communication apparatus 200 can be configured in any manner as long as the communication apparatus 200 has at least a unit for accessing the recording medium 210.

A wireless communication unit 211 is an interface for connecting to external apparatuses. The communication apparatus 200 according to the present example embodiment can transmit and receive data to and from the digital camera 100 via the wireless communication unit 211. According to the present example embodiment, the wireless communication unit 211 is an antenna, and the control unit 101 can connect to the digital camera 100 via the antenna. The wireless communication unit 211 uses communication protocols such as Picture Transfer Protocol over Internet Protocol (PTP/IP) and Hyper Text Transfer Protocol (HTTP).

A near-field wireless communication unit 212 is an interface for wirelessly communicating with communication apparatuses.

The near-field wireless communication unit 212 includes, for example, an antenna, a modulation/demodulation circuit for processing wireless signals, and a communication controller. The near-field wireless communication unit 212 outputs modulated wireless signals from the antenna and demodulates wireless signals received by the antenna to realize Bluetooth communication. The near-field wireless communication unit 212 according to the present example embodiment includes a first near-field wireless communication unit 212a and a second near-field wireless communication unit 212b. Communication via the first near-field wireless communication unit 212a is Bluetooth communication compliant with Bluetooth Low Energy. Communication via the second near-field wireless communication unit 212b is Bluetooth communication compliant with Bluetooth Classic. The communication apparatus 200 according to the present example embodiment constantly connects to an external apparatus via the near-field wireless communication unit 212 using Bluetooth Low Energy. Then, the communication apparatus 200 switches the connection to Bluetooth Classic based on a request to switch from Bluetooth Low Energy to Bluetooth Classic from the digital camera 100 and receives image data stored in the recording medium 110 of the digital camera 100.

A public network connection unit 213 is an interface that is used for performing public wireless communication.

The communication apparatus 200 can make a call with another device via the public network connection unit 213. At this time, the control unit 201 realizes the call by inputting and outputting audio signals via a microphone 214 and a speaker 215. According to the present example embodiment, the public network connection unit 213 is an antenna, and the control unit 101 can connect to a public network via the antenna. A single antenna can be used as both the wireless communication unit 211 and the public network connection unit 213.

The configuration of the communication apparatus 200 has been described above.

Use Case

Figure 3A:
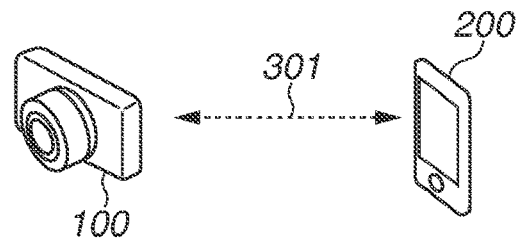
FIGS. 3A, 3B, and 3C are diagrams illustrating a use case according to the example embodiment of the present disclosure.
Figure 3B:
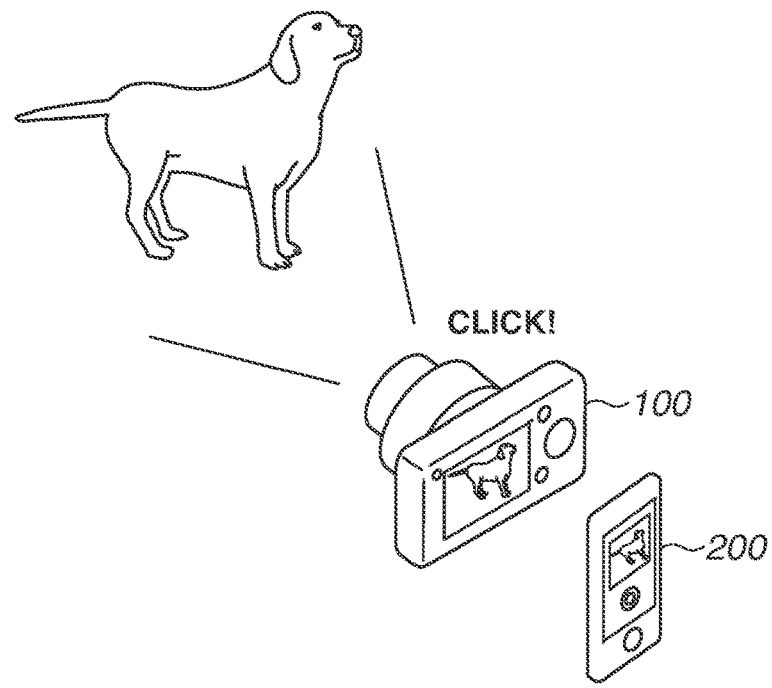
Figure 3C:
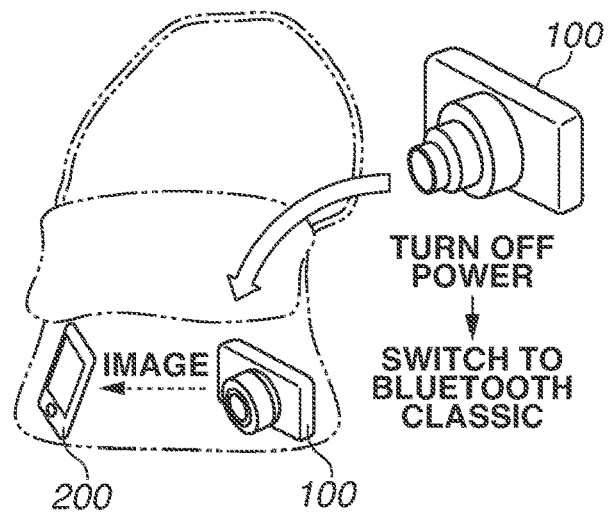

A use case according to one example embodiment will be described below. FIGS. 3A to 3C are views illustrating a use case where the digital camera 100 transfers images to communication apparatus 200. It is assumed that the digital camera 100 and the communication apparatus 200 have been paired with each other via Bluetooth Low Energy and via Bluetooth Classic.

First, as illustrated in FIG. 3A, a connection 301 is established between the digital camera 100 and the communication apparatus 200 by a user operation using Bluetooth Low Energy.

The user here can set an automatic image transfer function so that the digital camera 100 automatically transfers images to the communication apparatus 200 when an operation to turn off the digital camera 100 is performed. The setting of the automatic image transfer function can be switched between "enabled (on)" and "disabled (off)". According to the present example embodiment, the automatic image transfer function is set to "enabled".

While FIG. 3A illustrates an example where the digital camera 100 and the communication apparatus 200 connect to each other one-on-one, the communication apparatus 200 serving as a leader apparatus can simultaneously connect to a plurality of digital cameras serving as follower apparatuses.

Next, as illustrated in FIG. 3B, the user captures an image in the state where the automatic image transfer function is set to "enabled", and image data generated by the imaging unit 102 is recorded with an image transfer status "untransferred" in the recording medium 110 by the control unit 101.

The "image transfer status" herein refers to metadata added to image data generated by the digital camera 100. There are image transfer statuses "untransferred" and "transferred". In a case where the image transfer status of image data is "untransferred", the image data has not been transmitted to the communication apparatus 200. In a case where image data having the image transfer status "untransferred" is transmitted to the communication apparatus 200, the image transfer status of the image data is changed to "transferred" by the control unit 101. Specifically, in a case where the image transfer status of image data is "transferred", the image data has been transmitted to the communication apparatus 200. Thus, the digital camera 100 transmits only image data having the image transfer status "untransferred" to the communication apparatus 200 to prevent multiple transmission of image data to the communication apparatus 200.

Further, in a case where the digital camera 100 and the communication apparatus 200 establish a wireless LAN connection, the user can remotely control the digital camera 100 using the communication apparatus 200. For example, the user can issue an imaging instruction from the communication apparatus 200 to the digital camera 100 so that the digital camera 100 captures an image. Further, the user can control the display unit 206 of the communication apparatus 200 to sequentially display video images being captured by the digital camera 100.

As illustrated in FIG. 3C, when the user has finished imaging with the digital camera 100, the user turns off the digital camera 100 and puts the digital camera 100 into a bag. At this time, as the digital camera 100 is turned off, the digital camera 100 performs handover from Bluetooth Low Energy connection to Bluetooth Classic connection. When the Bluetooth Classic connection is established with the communication apparatus 200, the digital camera 100 transmits the image data captured in FIG. 3B to the communication apparatus 200 via Bluetooth Classic communication. Then, after finishing transferring all pieces of image data having the image transfer status "untransferred", the digital camera 100 changes a power state of the digital camera 100 to a sleep state.

A use case according to one example embodiment has been described above. As described above, the automatic image transfer function of the digital camera 100 automatically transmits captured image data to the communication apparatus 200 while the digital camera 100 is not in use by the user. This reduces user's labor in transferring image data.

State Transition of Digital Camera

Figure 4:
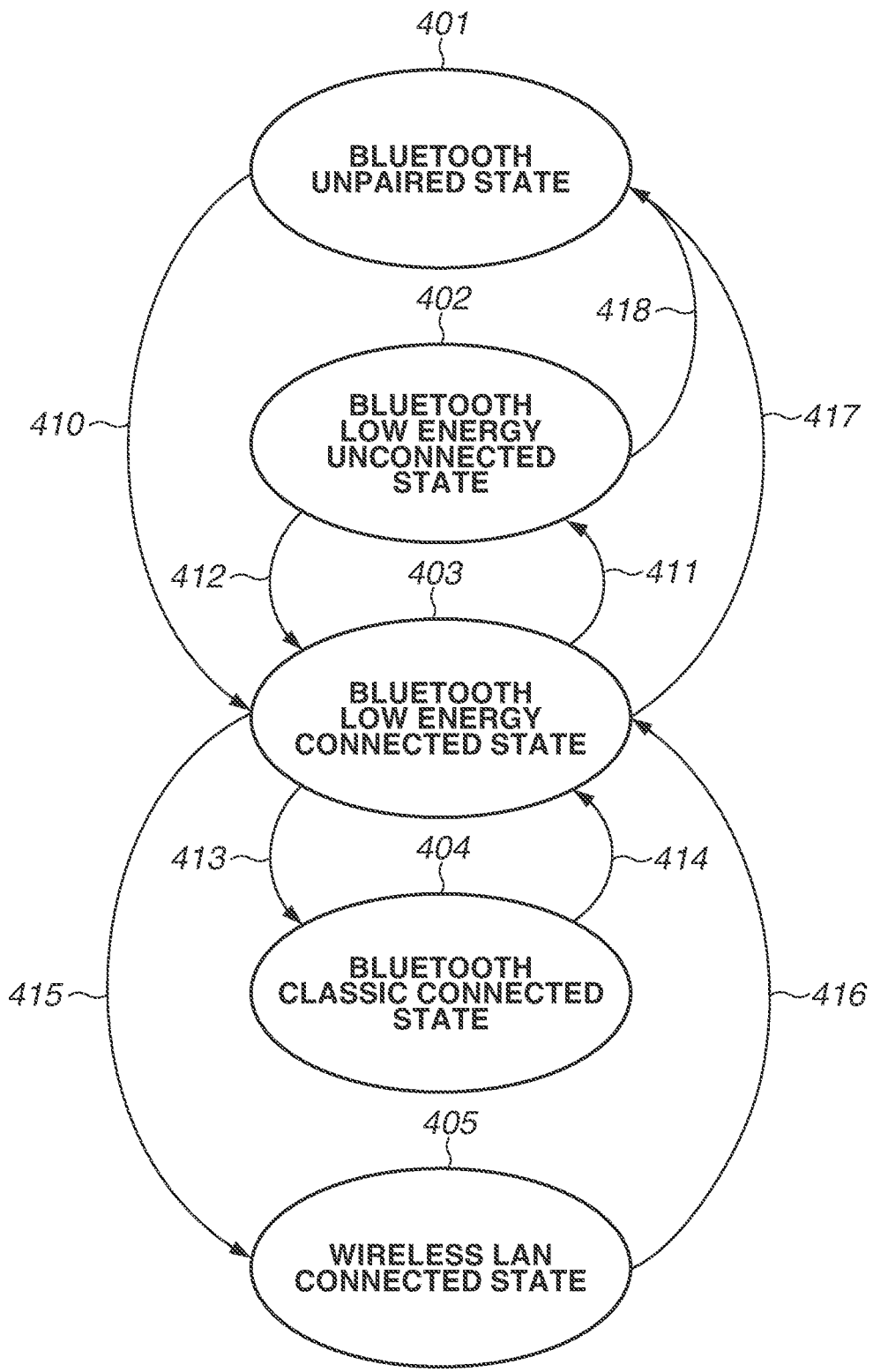
FIG. 4 is a state transition diagram illustrating communication states of the imaging apparatus according to the example embodiment of the present disclosure.

State transitions of a communication function of the digital camera 100 according to the present example embodiment will be described below with reference to FIG. 4. It is assumed that the automatic image transfer function of automatic image transfer to the communication apparatus 200 is set to "enabled".

There are five states of the communication function of the digital camera 100, which are a Bluetooth unpaired state 401, a Bluetooth Low Energy unconnected state 402, a Bluetooth Low Energy connected state 403, a Bluetooth Classic connected state 404, and a wireless LAN connected state 405.

The Bluetooth unpaired state 401 is an initial state of the digital camera 100. In a case where a user performs pairing processing 410 to pair the digital camera 100 with an external apparatus and the pairing is successful, the digital camera 100 is changed to the Bluetooth Low Energy connected state 403. The pairing processing 410 pairs the digital camera 100 with the external apparatus using both Bluetooth Low Energy and Bluetooth Classic.

When disconnection processing 411 is performed to disconnect the Bluetooth Low Energy connection in the Bluetooth Low Energy connected state 403, the digital camera 100 is changed to the Bluetooth Low Energy unconnected state 402. The disconnection processing 411 is performed in a case where, for example, the user performs an operation to disconnect the Bluetooth Low Energy connection on the digital camera 100 or the communication apparatus 200 or a predetermined time or longer has passed while the digital camera 100 remains in a range outside the Bluetooth Low Energy communication range. In a case where the user performs an unpairing operation 417 in the Bluetooth Low Energy connected state 403, the digital camera 100 is changed to an unpaired state 401.

In the Bluetooth Low Energy unconnected state 402, Bluetooth Low Energy connection processing 412 is performed to establish a Bluetooth Low Energy connection with the paired communication apparatus 200. Consequently, the digital camera 100 is changed to the Bluetooth Low Energy connected state 403 again. In a case where a user performs an unpairing operation 418 in the Bluetooth Low Energy unconnected state 402, the digital camera 100 is changed to the unpaired state 401.

According to the present example embodiment, in a case where the communication apparatus 200 connects to a plurality of digital cameras 100, each of the digital cameras 100 can be changed to the Bluetooth Low Energy connected state 403. In other words, the plurality of digital cameras 100 can simultaneously perform Bluetooth Low Energy communication with the communication apparatus 200.

In the Bluetooth Low Energy connected state 403, the digital camera 100 can be changed to the Bluetooth Classic connected state 404 or the wireless LAN connected state 405. The foregoing state transitions will be described below.

When the power of the digital camera 100 is turned off, Bluetooth Classic connection processing 413 is performed to change from the Bluetooth Low Energy connected state 403 to the Bluetooth Classic connected state 404. In the Bluetooth Classic connection processing 413, a process (handover process) of switching from Bluetooth Low Energy connection to Bluetooth Classic connection is performed. For example, an encryption key for establishing a Bluetooth Classic connection is transmitted and received (shared) during the Bluetooth Classic connection processing 413. In the Bluetooth Classic connected state 404, the digital camera 100 transmits image data having the image transfer status "untransferred" to the communication apparatus 200.

According to the present example embodiment, the communication apparatus 200 permits one digital camera 100 to establish a Bluetooth Classic connection with the communication apparatus 200. In other words, unlike the Bluetooth Low Energy connection, only one digital camera 100 can be changed to the Bluetooth Classic connected state 404. This is because congestion may occur in a case where the plurality of digital cameras 100 simultaneously transmits image data to the communication apparatus 200, and the communication apparatus 200 may fail to receive the image data due to the congestion. According to the present example embodiment, in a case where the plurality of digital cameras 100 having an established Bluetooth Low Energy connection to the communication apparatus 200 is turned off at nearly the same time, the communication apparatus 200 establishes a Bluetooth Classic connection with the digital camera 100 that is the transmitter of the first handover request received by the communication apparatus 200.

In the Bluetooth Classic connected state 404, disconnection processing 414 is performed to disconnect the Bluetooth Classic connection, and this changes the digital camera 100 to the Bluetooth Low Energy connected state 403. The disconnection processing 414 is performed, for example, in a case where all pieces of image data having the image transfer status "untransferred" are transmitted to the communication apparatus 200 or in a case where the user performs an operation of disconnecting the Bluetooth Classic connection on the digital camera 100 or the communication apparatus 200.

Next, wireless LAN handover processing 415 is performed to change from the Bluetooth Low Energy connected state 403 to the wireless LAN connected state 405. The wireless LAN handover processing 415 is triggered by reception of a wireless LAN handover request from the communication apparatus 200. In the wireless LAN handover processing 415, a process (handover process) of switching from Bluetooth Low Energy connection to wireless LAN connection is performed. For example, a service set identifier (SSID), a password, and an encryption key for establishing a wireless LAN connection are transmitted and received (shared) in the wireless LAN handover processing 415. Disconnection processing 416 of disconnecting the wireless LAN connection in the wireless LAN connected state 405 changes the digital camera 100 to the Bluetooth Low Energy connected state 403. The disconnection processing 416 is performed in a case where the user performs an operation of disconnecting the wireless LAN connection on the digital camera 100 or the communication apparatus 200.

According to the present example embodiment, the digital camera 100 can execute the automatic image transfer function even in a case where the power is turned off in the wireless LAN connected state 405. Specifically, processing is performed as described below. The digital camera 100 disconnects the wireless LAN connection and the Bluetooth Low Energy connection when the power is turned off, and changes to the Bluetooth Low Energy unconnected state 402. Thereafter, the digital camera 100 performs the Bluetooth Low Energy connection processing 412 and changes to the Bluetooth Low Energy connected state 403. Then, the digital camera 100 performs the Bluetooth Classic connection processing 413 and changes to the Bluetooth Classic connected state 404. After changing to the Bluetooth Classic connected state 404, the digital camera 100 transmits image data having the image transfer status "untransferred" to the communication apparatus 200.

State transitions of the communication function of the digital camera 100 according to the present example embodiment have been described above.

According to the present example embodiment, image data captured and generated by the digital camera 100 has the image transfer status "untransferred" in a case where the following two conditions are satisfied.

1. The automatic image transfer function of the digital camera 100 is set to "enabled".
2. The pairing is established using Bluetooth Low Energy, e.g., the digital camera 100 is in the Bluetooth Low Energy unconnected state 402, the Bluetooth Low Energy connected state 403, or the wireless LAN connected state 405.

As described above, according to the present example embodiment, the communication apparatus 200 can simultaneously establish a Bluetooth Low Energy connection with the plurality of digital cameras 100. On the other hand, the communication apparatus 200 establishes a Bluetooth Classic connection only with one digital camera 100. Thus, in a case where the automatic image transfer function of each of the plurality of digital cameras 100 is set to "enabled", the following issue arises. For example, in a case where the communication apparatus 200 is in a state of having an established Bluetooth Low Energy connection with the plurality of digital cameras 100 and two or more of the digital cameras 100 are turned off at nearly the same time, one of the digital cameras 100 can establish a Bluetooth Classic connection with the communication apparatus 200 while the other cannot establish a Bluetooth Classic connection. In this case, the digital camera 100 fails to establish a Bluetooth Classic connection with the communication apparatus 200, so that the digital camera 100 is forced to stop the execution of the ongoing automatic image transfer function that has been once started.

To solve the issue, according to the present example embodiment, the communication apparatus 200 notifies the digital camera 100 of information about whether the communication apparatus 200 is in a state of being available for automatic image transfer in order to reduce the possibility that the process of the automatic image transfer function is stopped when the process is incomplete.

Transferability Flowchart

FIG. 5A is a flowchart illustrating an example of a process by which the digital camera 100 records a parameter indicating whether the automatic image transfer via Bluetooth Classic is performable according to the present example embodiment. FIG. 5B is a flowchart illustrating an example of a process by which the communication apparatus 200 transmits a parameter indicating whether the automatic image transfer via Bluetooth Classic is performable according to the present example embodiment.

Hereinafter, the performability of the automatic image transfer via Bluetooth Classic will be also referred to as "transferability".

In each of the flowcharts in FIGS. 5A and 5B, the digital camera 100 and the communication apparatus 200 are paired with each other via Bluetooth. Further, the automatic image transfer function of the digital camera 100 is set to "enabled".

First, a process relating to the transferability that is performed by the digital camera 100 will be described below with reference to FIG. 5A. The process is realized by the control unit 101 loading a program recorded in the non-volatile memory 103 to the working memory 104 and executing the loaded program. The process in the flowchart is started when, for example, the power of the digital camera 100 is turned on by the user via the operation unit 105.

In step S501, the control unit 101 establishes a Bluetooth Low Energy connection with the communication apparatus 200 via the first near-field wireless communication unit 112a. The control unit 101 waits until a Bluetooth Low Energy connection is established with the communication apparatus 200. In a case where a Bluetooth Low Energy connection is established with the communication apparatus 200 (YES in step S501), step S502 is performed.

In step S502, the control unit 101 transmits a transferability inquiry request to the communication apparatus 200 via the near-field wireless communication unit 112a.

In step S503, the control unit 101 waits until a transferability notification is received from the communication apparatus 200. The transferability notification is, for example, a parameter indicating "allow" in a case where the automatic image transfer is performable or a parameter indicating "deny" in a case where the automatic image transfer is unperformable. In a case where a transferability notification is received (YES in step S503), step S504 is performed.

In step S504, the control unit 101 records the transferability notification received in step S503 in the working memory 104.

A process relating to the transferability that is performed by the digital camera 100 has been described above.

Next, a process relating to the transferability that is performed by the communication apparatus 200 will be described below with reference to FIG. 5B.

The process is realized by the control unit 201 loading a program recorded in the non-volatile memory 203 to the working memory 204 and executing the loaded program. The process in the flowchart is started when, for example, the control unit 201 activates an application relating to the automatic image transfer.

In step S505, the control unit 201 establishes a Bluetooth Low Energy connection with the digital camera 100 via the near-field wireless communication unit 212a. The control unit 201 waits until a Bluetooth Low Energy connection is established with the digital camera 100. In a case where a Bluetooth Low Energy connection is established (YES in step S505), step S506 is performed.

In step S506, the control unit 201 waits until a transferability inquiry request is received from the digital camera 100 via the near-field wireless communication unit 212a. In a case where a transferability inquiry request is received (YES in step S506), the control unit 201 records an identifier of the digital camera 100 that is the transmitter of the transferability inquiry request and a parameter indicating the receipt of the transferability inquiry request in the working memory 204. In a case where a transferability inquiry request is received (YES in step S506), step S507 is performed.

In step S507, the control unit 201 transmits a transferability notification to the digital camera 100 via the near-field wireless communication unit 212a. As described above, the transferability notification is, for example, a parameter indicating "allow" in a case where the automatic image transfer is performable or a parameter indicating "deny" in a case where the automatic image transfer is unperformable.

A process relating to the transferability that is performed by the communication apparatus 200 has been described above.

In the state of having an established Bluetooth Low Energy connection, the communication apparatus 200 transmits a transferability notification (allow or deny) to the digital camera 100 having transmitted a transferability inquiry request each time the transferability state of the communication apparatus 200 changes.

The digital camera 100 also performs steps S503 and S504 each time a transferability notification from the communication apparatus 200 is received.

As described above, the transferability state is recorded in the digital camera 100, and each time there is a change in the transferability state, the communication apparatus 200 notifies the digital camera 100 of the change via Bluetooth Low Energy communication. Thus, even in a case where the plurality of digital cameras 100 is in the state of having an established Bluetooth Low Energy connection with the communication apparatus 200, performing processing based on the transferability state reduces the possibility that the process of the automatic image transfer function that has been started is forcibly stopped before the process is completed.

Sequence of Automatic Image Transfer

A sequence of automatic image transfer according to the present example embodiment will be described below with reference to FIG. 6.

Figure 6:
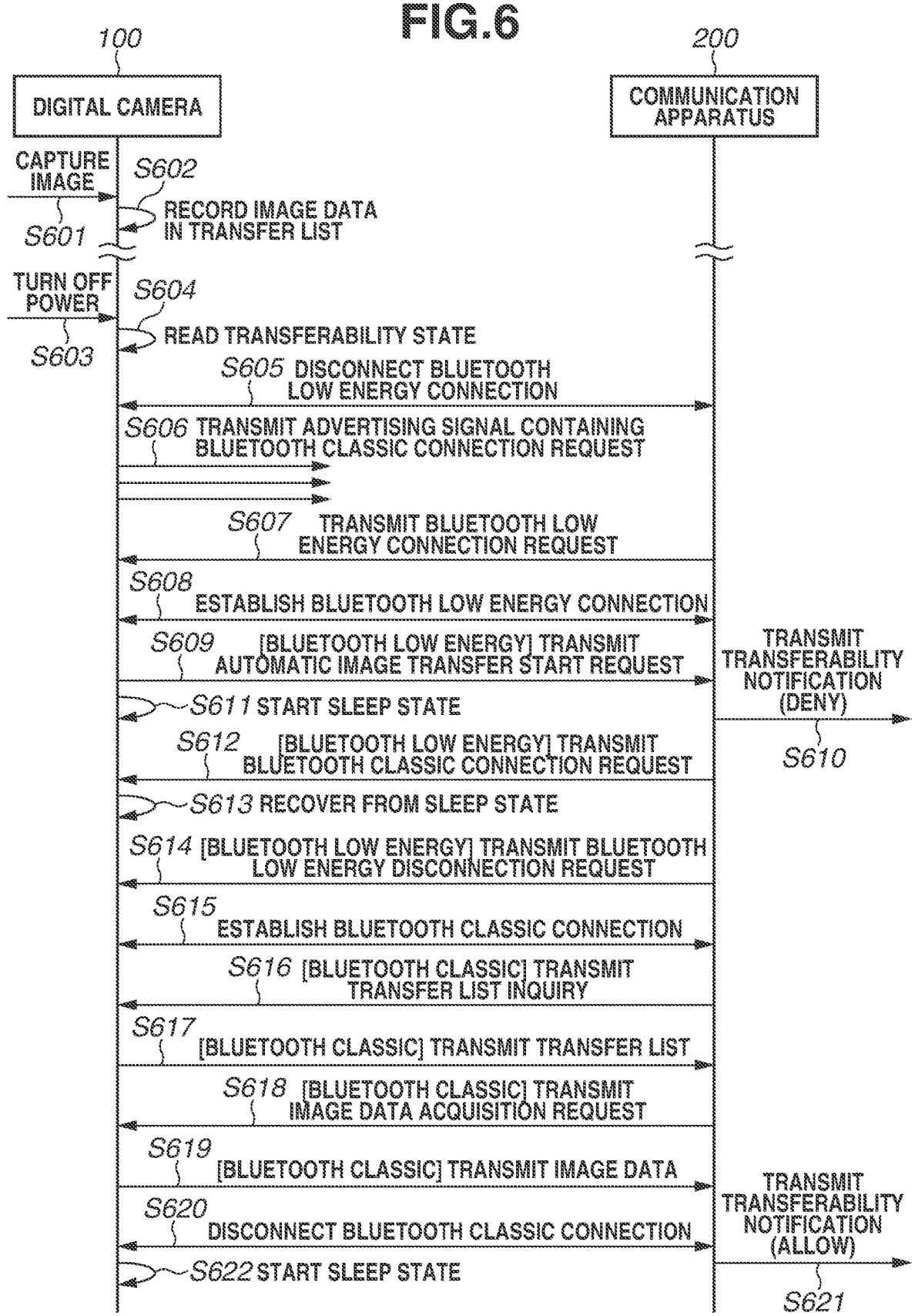
FIG. 6 is a sequence diagram illustrating an image transfer process performed via Bluetooth Classic communication according to the example embodiment of the present disclosure.

In the sequence diagram in FIG. 6, the digital camera 100 and the communication apparatus 200 are paired with each other via Bluetooth. The automatic image transfer function of the digital camera 100 is set to "enabled".

In step S601, the user captures a subject image by operating the digital camera 100.

The imaging unit 102 of the digital camera 100 generates image data.

In step S602, the digital camera 100 records the image data generated in step S601 with the image transfer status "untransferred" in the recording medium 110. Further, the digital camera 100 records the image data generated in step S601 in a transfer list in association with an identifier of the communication apparatus 200 with which the Bluetooth Low Energy connection is established. The transfer list is data for managing image data to be transferred by the automatic image transfer function.

In step S603, the user operates the operation unit 105 of the digital camera 100 and turns off the power.

In step S604, the digital camera 100 reads the transferability state recorded in the working memory 104 and determines whether the automatic image transfer is performable. For example, in a case where it is determined that the transferability notification indicates "allow", step S605 is performed. On the other hand, for example, in a case where it is determined that the transferability notification indicates "deny", the digital camera 100 changes to a power-off state.

In step S605, the digital camera 100 disconnects the Bluetooth Low Energy connection via the near-field wireless communication unit 112a.

In step S606, the digital camera 100 starts transmitting an advertising signal via the near-field wireless communication unit 112a. The communication apparatus 200 receives the advertising signal. The advertising signal contains information indicating a Bluetooth Classic connection request.

In step S607, the communication apparatus 200 transmits a Bluetooth Low Energy connection request via the near-field wireless communication unit 212a in response to the advertising signal received in step S606. The digital camera 100 receives the Bluetooth Low Energy connection request.

In step S608, the digital camera 100 and the communication apparatus 200 establish a Bluetooth Low Energy connection.

In step S609, the digital camera 100 transmits an automatic image transfer start request via the near-field wireless communication unit 112a.

In step S610, the communication apparatus 200 transmits a transferability notification indicating "deny" via the near-field wireless communication unit 212a to a digital camera 100 that has a Bluetooth Low Energy connection to the communication apparatus 200 and is other than the digital camera 100 having transmitted the automatic image transfer start request. From the transferability notification, the digital camera 100 that is not the transmitter of the automatic image transfer start request recognizes that the communication apparatus 200 does not allow Bluetooth Classic connection with the digital camera 100 that is not the transmitter of the automatic image transfer start request. As described above, the communication apparatus 200 transmits the transferability notification in response to the automatic image transfer start request before a Bluetooth Classic connection is established. The communication apparatus 200 performs the foregoing step so that the digital camera 100 that is not the transmitter of the automatic image transfer start request is prevented from executing the automatic image transfer function at a timing when the automatic image transfer function cannot be started.

In step S611, the digital camera 100 is changed to the sleep state and remains in the sleep state until a Bluetooth Classic connection request is received from the communication apparatus 200.

In step S612, the communication apparatus 200 transmits a Bluetooth Classic connection request via the near-field wireless communication unit 212a to the digital camera 100 that is the transmitter of the automatic image transfer start request.

In step S613, the digital camera 100 recovers from the sleep state based on receipt of the Bluetooth Classic connection request from the communication apparatus 200 via the near-field wireless communication unit 112a in step S612.

In step S614, the communication apparatus 200 transmits a Bluetooth Low Energy disconnection request to the digital camera 100 via the near-field wireless communication unit 212a and disconnects the Bluetooth Low Energy connection.

In step S615, the digital camera 100 and the communication apparatus 200 establish a Bluetooth Classic connection. As in the order of steps S614 and S615, the digital camera 100 and the communication apparatus 200 first disconnect the Bluetooth Low Energy connection and then establish the Bluetooth Classic connection to reduce the probability of occurrence of congestion.

In step S616, the communication apparatus 200 transmits an inquiry to the digital camera 100 via the near-field wireless communication unit 212b to check whether the transfer list includes image data having the image transfer status "untransferred".

In step S617, the digital camera 100 transmits the transfer list including information about image data having the image transfer status "untransferred" to the communication apparatus 200 via the near-field wireless communication unit 112b. In a case where there is no image data having the image transfer status "untransferred", the digital camera 100 stores a value (e.g., zero or null) indicating that the transfer list includes no image data having the image transfer status "untransferred". The sequence illustrates a case where there is image data having the image transfer status "untransferred".

In step S618, the communication apparatus 200 transmits a request to acquire the image data having the image transfer status "untransferred" to the digital camera 100 via the near-field wireless communication unit 212b based on the transfer list received in step S617.

In step S619, the digital camera 100 transmits the requested image data to the communication apparatus 200 via the near-field wireless communication unit 112a in response to the request from the communication apparatus 200. At this time, the digital camera 100 overwrites the image transfer status of the image data transmitted to the communication apparatus 200 with the image transfer status "transferred". Further, the digital camera 100 adds the image transfer status "transferred" to the transfer list in association with the identifier of the communication apparatus 200 having the Bluetooth Low Energy connection and records the image transfer status "transferred" in the recording medium 110. Further, the digital camera 100 records the image data transmitted to the communication apparatus 200 in the transfer list in association with the identifier of the communication apparatus 200.

In step S620, the digital camera 100 disconnects the Bluetooth Classic connection to the communication apparatus 200 upon completion of transmission of all pieces of image data requested by the communication apparatus 200.

In step S621, the digital camera 100 transmits a transferability notification indicating "allow" via the near-field wireless communication unit 212a to the digital camera 100 that has a Bluetooth Low Energy connection to the communication apparatus 200 and is other than the digital camera 100 having transmitted the automatic image transfer start request.

In step S622, the digital camera 100 is changed to the sleep state based on the disconnection of the Bluetooth Classic connection.

A sequence of the automatic image transfer according to the present example embodiment has been described above.

Flowchart of Communication Apparatus

Figure 7A:
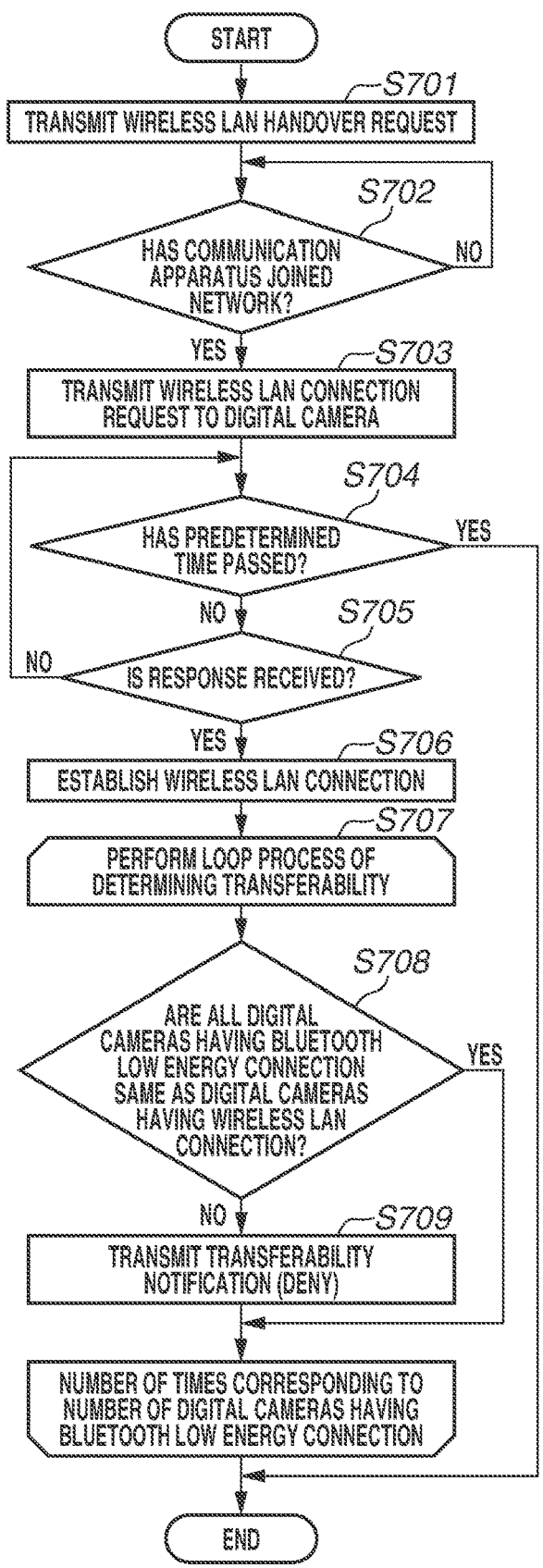
FIGS. 7A and 7B are flowcharts illustrating processes performed by the communication apparatus for establishing and disconnecting a wireless LAN connection according to the example embodiment of the present disclosure.
Figure 7B:
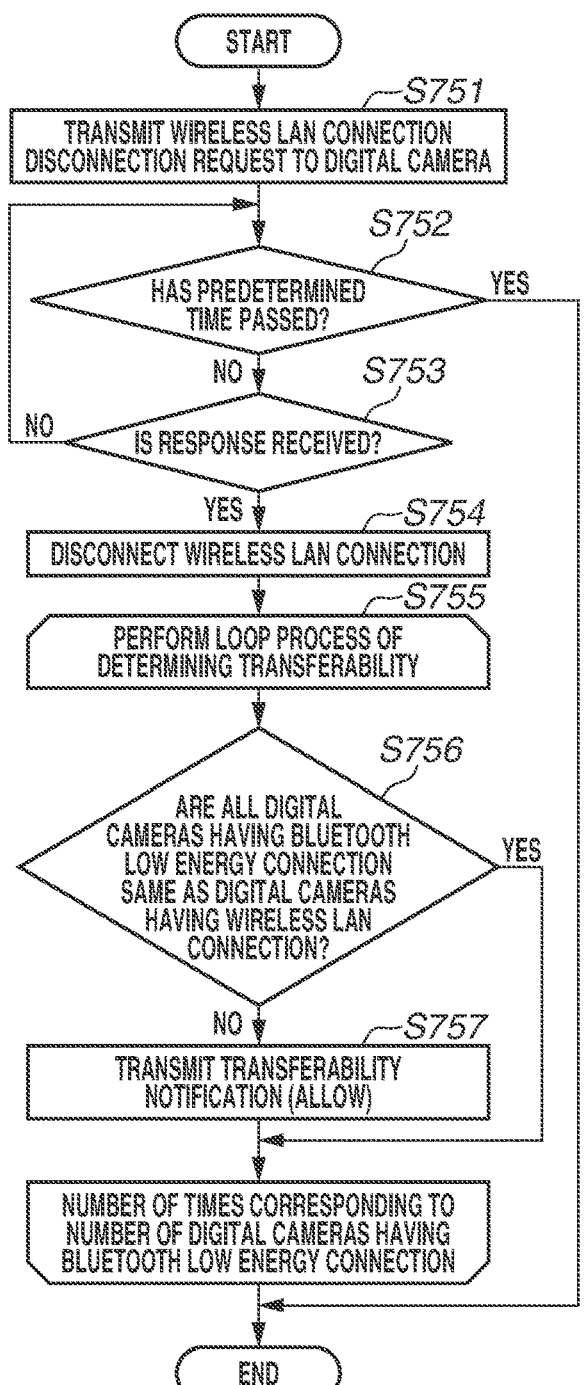

FIGS. 7A and 7B are flowcharts of processing performed by the communication apparatus 200 for establishing and disconnecting a wireless LAN connection according to the present example embodiment. In the flowcharts illustrated in FIGS. 7A and 7B, it is assumed that the digital camera 100 and the communication apparatus 200 are paired with each other via Bluetooth, and that the automatic image transfer function of the digital camera 100 is set to "enabled".

FIG. 7A is a flowchart of processing performed by the communication apparatus 200 for establishing a wireless LAN connection.

In step S701, the control unit 201 transmits a wireless LAN handover request to the digital camera 100 using Bluetooth Low Energy communication via the near-field wireless communication unit 212a based on a user operation as a trigger. The digital camera 100 activates as a simple AP and forms a network upon receipt of the wireless LAN handover request.

In step S702, the control unit 201 determines whether the communication apparatus 200 has joined the network formed by the digital camera 100. The control unit 201 waits until the communication apparatus 200 joins the network formed by the digital camera 100. In a case where the control unit 201 determines that the communication apparatus 200 has joined the network (YES in step S702), the processing proceeds to step S703.

In step S703, the control unit 201 transmits a wireless LAN connection request to the digital camera 100 via the wireless communication unit 211.

In step S704, the control unit 201 determines whether a predetermined time has passed since the performance of step S703. In a case where the control unit 201 determines that the predetermined time has passed (YES in step S704), establishment of a wireless LAN connection is quit, and the process ends. On the other hand, in a case where the predetermined time has not passed (NO in step S704), the processing proceeds to step S705.

In step S705, the control unit 201 determines whether a response to the wireless LAN connection request is received from the digital camera 100 via the wireless communication unit 211. In a case where the control unit 201 determines that a response is received (YES in step S705), the processing proceeds to step S706. On the other hand, in a case where the control unit 201 determines that no response is received (NO in step S705), the processing returns to step S704.

In step S706, the control unit 201 establishes a wireless LAN connection with the digital camera 100.

In step S707, the control unit 201 performs a loop process of determining transferability on each digital camera 100 having established a Bluetooth Low Energy connection with the communication apparatus 200. The loop process according to the present example embodiment is a process of repeating steps S708 and S709. This process assumes the use case illustrated in FIG. 3B. In the use case illustrated in FIG. 3B, the user can remotely control the digital camera 100 to capture images using the communication apparatus 200 in a case where a wireless LAN connection is established between the digital camera 100 and the communication apparatus 200. In other words, the digital camera 100 having an established wireless LAN connection to the communication apparatus 200 is likely to capture images and generate image data. In a case where the wireless LAN connection is disconnected and the power of the digital camera 100 is turned off, image data generated by the digital camera 100 is likely to be transmitted to the communication apparatus 200. Specifically, the digital camera 100 having established a wireless LAN connection is more likely to transmit image data to the communication apparatus 200 sometime soon than the other digital camera 100 having established a Bluetooth Low Energy connection. Thus, in order to ensure receipt of image data from the digital camera 100 having the wireless LAN connection to the communication apparatus 200, the communication apparatus 200 transmits a notification indicating that the automatic image transfer is unperformable to a digital camera 100 having no wireless LAN connection to the communication apparatus 200. From the notification, the digital camera 100 having no wireless LAN connection to the communication apparatus 200 recognizes that the communication apparatus 200 does not allow Bluetooth Classic connection with the digital camera 100 having no wireless LAN connection to the communication apparatus 200.

In step S708, the control unit 201 determines whether each digital camera 100 having established a Bluetooth Low Energy connection is the same as the digital camera 100 having the wireless LAN connection. In a case where the control unit 201 determines that they are not the same digital camera (NO in step S708), the processing proceeds to step S709. On the other hand, in a case where the control unit 201 determines that they are the same digital camera (YES in step S708), the loop process is continued without performing step S709.

In step S709, the control unit 201 transmits a transferability notification indicating "deny" using Bluetooth Low Energy communication via the near-field wireless communication unit 212a. The digital camera 100 having received the transferability notification records the received transferability information in the working memory 104 as described above with reference to FIG. 5A.

The control unit 201 performs foregoing loop process on each digital camera 100 having established a Bluetooth Low Energy connection.

A flowchart of the processing performed by the communication apparatus 200 for establishing a wireless LAN connection according to the present example embodiment has been described above.

In a case where the digital camera 100 having a wireless LAN connection is turned off, the digital camera 100 executes the automatic image transfer function. In this case, a wireless LAN disconnection request is transmitted from the digital camera 100 to the communication apparatus 200, and the wireless LAN connection is disconnected. Then, the digital camera 100 transmits an automatic image transfer start request to the communication apparatus 200, and the automatic image transfer is started.

Meanwhile, the digital camera 100 is in a power-on state in a case where the user disconnects the wireless LAN connection to the digital camera 100 from the communication apparatus 200. Further, in this case, the user may be operating a digital camera different from the digital camera 100 having the wireless LAN connection. Thus, according to the present example embodiment, in a case where the communication apparatus 200 disconnects the wireless LAN connection to the digital camera 100, the communication apparatus 200 is brought into a state of being available for automatic image transfer with respect to other digital cameras not having a wireless LAN connection and having established a Bluetooth Low Energy connection.

FIG. 7B is a flowchart of processing performed by the communication apparatus 200 for disconnecting a wireless LAN connection.

In step S751, the control unit 201 transmits a wireless LAN connection disconnection request via the wireless communication unit 211. Based on the request, the digital camera 100 starts processing to stop the simple AP. At this time, the digital camera 100 does not turn off the power.

In step S752, the control unit 201 determines whether a predetermined time has passed since the performance of step S751. In a case where the control unit 201 determines that the predetermined time has passed (YES in step S752), the process ends. On the other hand, in a case where the control unit 201 determines that the predetermined time has not passed (NO in step S752), the processing proceeds to step S753.

In step S753, the control unit 201 determines whether a response to the disconnection request is received from the digital camera 100 using wireless LAN communication via the wireless communication unit 211. In a case where the control unit 201 determines a response is received (YES in step S753), the processing proceeds to step S754. On the other hand, in a case where the control unit 201 determines no response is received (NO in step S753), the processing returns to step S752.

In step S754, the control unit 201 completes disconnection of the wireless LAN connection to the digital camera 100.

In step S755, the control unit 201 performs a loop process of determining transferability on each digital camera 100 having established a Bluetooth Low Energy connection to the communication apparatus 200.

The loop process according to the present example embodiment is a process of repeating steps S756 and S757.

In step S756, the control unit 201 determines whether each digital camera 100 having established an Bluetooth Low Energy connection is the same as the digital camera 100 having the wireless LAN connection. In a case where the control unit 201 determines that they are not the same camera (NO in step S756), the processing proceeds to step S757. On the other hand, in a case where the control unit 201 determines that they are the same camera (YES in step S756), the loop process is continued without performing step S755.

In step S757, the control unit 201 transmits a transferability notification indicating "allow" using Bluetooth Low Energy communication via the near-field wireless communication unit 212a. The digital camera 100 having received the transferability notification records the received transferability information in the working memory 104 as described above with reference to FIG. 5A.

A flowchart of the processing performed by the communication apparatus 200 for disconnecting a wireless LAN connection according to the present example embodiment has been described above.

While the present example embodiment has been described using a case where the Bluetooth Classic image transfer function is executed when the power of the digital camera 100 is turned off as a trigger, the trigger can be another state transition. For example, the trigger can be a state transition of the digital camera 100 to a power-saving mode such as the sleep state instead of the turning off of the power.

Flowchart of Digital Camera

Figure 8:
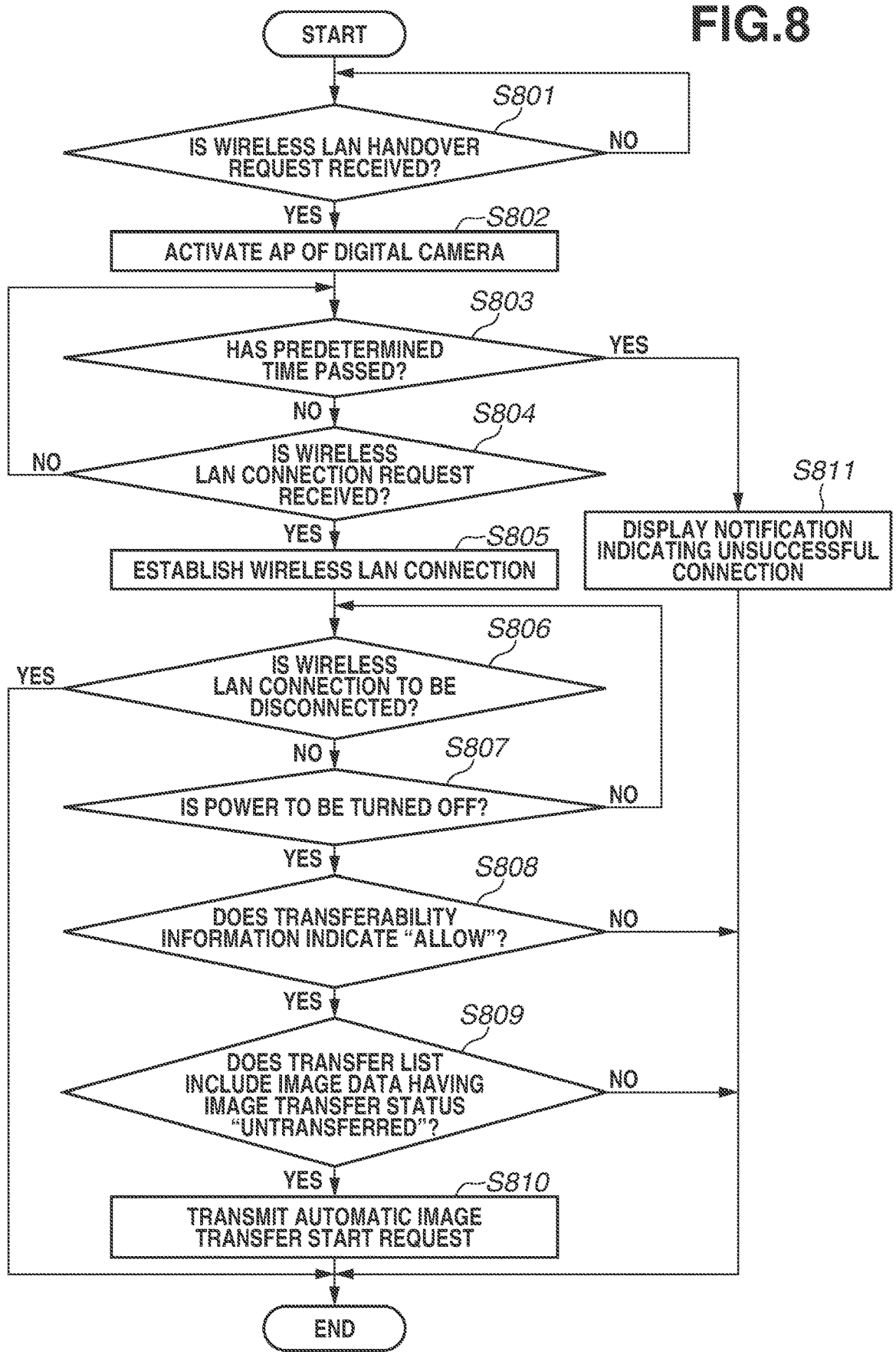
FIG. 8 is a flowchart illustrating a process performed by a digital camera for establishing a wireless LAN connection according to the example embodiment of the present disclosure.

FIG. 8 is a flowchart of processing performed by the digital camera 100 for establishing a wireless LAN connection. In the flowchart illustrated in FIG. 8, it is assumed that the digital camera 100 and the communication apparatus 200 are paired with each other via Bluetooth, and that the automatic image transfer function of the digital camera 100 is set to "enabled".

In step S801, the control unit 101 determines whether a wireless LAN handover request is received from the communication apparatus 200 using Bluetooth Low Energy communication via the near-field wireless communication unit 112a. In a case where the control unit 101 determines that a handover request is received (YES in step S801), the processing proceeds to step S802. On the other hand, in a case where the control unit 101 determines that no handover request is received (NO in step S801), the control unit 101 waits.

In step S802, the control unit 101 activates the simple AP using the wireless communication unit 111 and forms a network.

In step S803, the control unit 101 determines whether a predetermined time has passed since the performance of step S802. In a case where the control unit 101 determines that the predetermined time has passed (YES in step S803), the processing proceeds to step S811. On the other hand, in a case where the control unit 101 determines that the predetermined time has not passed (NO in step S803), the processing proceeds to step S804.

In step S804, the control unit 101 determines whether a wireless LAN connection request is received from the communication apparatus 200 via the wireless communication unit 111. In a case where the control unit 101 determines that a wireless LAN connection request is received (YES in step S804), step S805 is performed. On the other hand, in a case where the control unit 101 determines that no wireless LAN connection request is received (NO in step S804), the processing returns to step S803.

In step S805, the control unit 101 establishes a wireless LAN connection with the communication apparatus 200 via the wireless communication unit 111.

In step S806, the control unit 101 determines whether the wireless LAN connection is to be disconnected. For example, the control unit 101 determines whether a user operation to disconnect the wireless LAN connection is performed. In a case where the control unit 101 determines that the wireless LAN connection is to be disconnected (YES in step S806), the process in the flowchart ends. On the other hand, in a case where the control unit 101 determines that the wireless LAN connection is not to be disconnected (NO in step S806), the processing proceeds to step S807.

In step S807, the control unit 101 determines whether the power is to be turned off. For example, the control unit 101 determines whether a user operation to turn off the power is performed. In a case where the control unit 101 determines that an operation to turn off the power is performed (YES in step S807), the processing proceeds to step S808. On the other hand, in a case where the control unit 101 determines that the power is not to be turned off (NO in step S807), the processing returns to step S806.

In step S808, the control unit 101 determines whether the automatic image transfer to the communication apparatus 200 is allowed. For example, the control unit 101 reads the transferability information recorded in the working memory 104 and determines whether the read information indicates "allow" or "deny". In a case where the automatic image transfer to the communication apparatus 200 is allowed (the transferability information indicates "allow") (YES in step S808), the processing proceeds to step S809.

On the other hand, in a case where the automatic image transfer to the communication apparatus 200 is not allowed (the transferability information indicates "deny") (NO in step S808), the process in the flowchart ends.

In step S809, the control unit 101 determines whether there is image data to be transmitted to the communication apparatus 200. For example, the control unit 101 reads the transfer list recorded in the recording medium 110 and determines whether the read transfer list includes image data having the image transfer status "untransferred". In a case where the control unit 101 determines that there is image data to be transmitted to the communication apparatus 200 (image data having the image transfer status "untransferred" is included) (YES in step S809), the processing proceeds to step S810.

On the other hand, in a case where the control unit 101 determines that there is no image data to be transmitted to the communication apparatus 200 (no image data having the image transfer status "untransferred" is included) (NO in step S809), the process in the flowchart ends.

In step S810, the control unit 101 transmits an automatic image transfer start request to the communication apparatus 200 via the wireless communication unit 111. Then, the control unit 101 starts transmitting the image data having the image transfer status "untransferred" to the communication apparatus 200.

In step S803, in a case where the predetermined time or longer has passed since the activation of the simple AP (YES in step S803), the processing proceeds to step S811. In step S811, the control unit 101 issues (displays) a notification of the timeout of the wireless LAN connection processing on the display unit 106.

A flowchart of the processing performed by the digital camera 100 for establishing a wireless LAN connection has been described above.

OTHER EXAMPLE EMBODIMENTS

The present disclosure can also be realized by the following process. Specifically, in various embodiments, a program for realizing one or more functions of the above-described example embodiments is supplied to a system or an apparatus via a network or a storage medium, and one or more processors of a computer of the system or the apparatus read the program and execute the read program. Further, various embodiments of the present disclosure can also be realized by a circuit (e.g., application-specific integrated circuit (ASIC)) configured to realize one or more functions.

It should be noted that the present invention is not limited to the above-described example embodiments and that components can be modified in the implementation phase without departing from the spirit of the present invention. Further, various embodiments can be made by combining a plurality of components disclosed in the above-described example embodiments as appropriate. For example, one or some of the components described in the above example embodiments can be eliminated in other embodiments. Furthermore, components according to different example embodiments can be combined as appropriate.

Various embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While example embodiments have been described, it is to be understood that the invention is not limited to the disclosed example embodiments. The scope of the following claims is to be accorded the broadest interpretation so as to encompass all such modifications and equivalent structures and functions.

This application claims the benefit of Japanese Patent Application No. 2021-074968, filed Apr. 27, 2021, which is hereby incorporated by reference herein in its entirety.

What is claimed is:

1. An information processing apparatus comprising:
a first wireless communication unit configured to perform wireless communication with a plurality of communication apparatuses simultaneously;
a second wireless communication unit configured to perform wireless communication with one of the plurality of communication apparatuses selectively;
a control unit configured to control establishment of a wireless connection with one of the plurality of communication apparatuses via the second wireless communication unit based on information shared via the first wireless communication unit; and
a transmission unit configured to transmit, in a case a request to establish a wireless connection via the second wireless communication unit is received from one of the plurality of communication apparatuses, a notification to a communication apparatus that has a wireless connection to the information processing apparatus via the first wireless communication unit, and is not a transmitter of the request, so that the communication apparatus receiving the notification recognizes that a connection via the second wireless communication unit is not allowed.

2. The information processing apparatus according to claim 1, wherein in a case where a state relating to connectivity via the second wireless communication unit is changed, the transmission unit transmits a notification to the communication apparatus through the wireless communication via the first wireless communication unit so that the communication apparatus receiving the notification recognizes that a connection via the second wireless communication unit is allowed or not allowed.

3. The information processing apparatus according to claim 1, wherein in a case where the second communication unit is to establish a wireless connection with one of the plurality of communication apparatuses, the first communication unit disconnects a wireless connection with the one of the plurality of communication apparatuses with which the second communication unit is to establish the wireless connection.

4. The information processing apparatus according to claim 3, wherein the second communication unit establishes the wireless connection with the one of the plurality of communication apparatuses when the first communication unit disconnects the wireless connection with the one of the plurality of communication apparatuses.

5. The information processing apparatus according to claim 3, wherein in a case where data to be received from the one of the plurality of communication apparatuses is completely received through the wireless communication via the second wireless communication unit, the second wireless communication unit disconnects the wireless connection with the one of the plurality of communication apparatuses, and the first wireless communication unit establishes a wireless connection with the one of the plurality of communication apparatuses.

6. The information processing apparatus according to claim 5, wherein a list of the data to be received is received through the wireless communication via the second wireless communication unit.

7. The information processing apparatus according to claim 3, wherein in a case where data to be received from the one of the plurality of communication apparatuses is completely received through the wireless communication via the second wireless communication unit, the transmission unit transmits a notification so that a recipient of the notification recognizes that a connection via the second wireless communication unit is allowed.

8. The information processing apparatus according to claim 1, further comprising a third wireless communication unit configured to perform faster wireless communication than the wireless communication via the first wireless communication unit and the wireless communication via the second wireless communication unit,
wherein in a case where the third wireless communication unit establishes a wireless connection with one of the plurality of communication apparatuses, the transmission unit transmits a notification to a communication apparatus that has a wireless connection via the first wireless communication unit and has no wireless connection via the third wireless communication unit so that the communication apparatus receiving the notification recognizes that a connection via the second wireless communication unit is not allowed.

9. The information processing apparatus according to claim 8, wherein in a case where the third wireless communication unit is to disconnect the wireless connection with the one of the plurality of communication apparatuses, the transmission unit transmits a notification to the communication apparatus that has no wireless connection via the third wireless communication unit so that the communication apparatus receiving the notification recognizes that a connection via the second wireless communication unit is allowed.

10. An information processing apparatus comprising:
a first wireless communication unit configured to perform wireless communication with a plurality of communication apparatuses simultaneously;
a second wireless communication unit configured to perform wireless communication with one of the plurality of communication apparatuses selectively via an access point;
a third wireless communication unit configured to perform wireless communication with one of the plurality of communication apparatuses selectively without the access point;
a control unit configured to control, based on information shared with one of the plurality of communication apparatuses that is connected via the first wireless communication unit, establishment of a wireless connection via the second wireless communication unit with the communication apparatus sharing the information; and
a transmission unit configured to transmit, in a case where a connection via the second wireless communication unit is to be established with the communication apparatus sharing the information, a notification to a communication apparatus having no wireless connection via the second wireless communication unit among the plurality of communication apparatuses connected via the first wireless communication unit so that the communication apparatus receiving the notification recognizes that a connection via the third wireless communication unit is not allowed.

11. A method for controlling an information processing apparatus, the method comprising:
performing first wireless communication to perform wireless communication with a plurality of communication apparatuses simultaneously;
performing second wireless communication to perform wireless communication with one of the plurality of communication apparatuses selectively;
controlling establishment of a wireless connection with one of the plurality of communication apparatuses via the second wireless communication based on information shared via the first wireless communication; and
transmitting, in a case where a request to establish a wireless connection via the second wireless communication is received from one of the plurality of communication apparatuses, a notification to a communication apparatus that has a wireless connection via the first wireless communication and is not a transmitter of the request so that the communication apparatus receiving the notification recognizes that a connection via the second wireless communication is not allowed.

12. The method according to claim 11, wherein in a case where a state relating to connectivity via the second wireless communication is changed, a notification is transmitted to the communication apparatus through the wireless communication via the first wireless communication so that the communication apparatus receiving the notification recognizes that a connection via the second wireless communication is allowed or not allowed.

13. The method according to claim 11, wherein in a case where a wireless connection is to be established with one of the plurality of communication apparatuses via the second wireless communication, a wireless connection via the first wireless communication with the one of the plurality of communication apparatuses with which the wireless connection via the second wireless communication is to be established is disconnected.

14. The method according to claim 13, wherein the wireless connection with the one of the plurality of communication apparatuses via the second wireless communication is established when the wireless connection with the one of the plurality of communication apparatuses via the first wireless communication is disconnected.

15. The method according to claim 13, wherein in a case where data to be received from the one of the plurality of communication apparatuses is completely received through the wireless communication via the second wireless communication, the wireless connection with the one of the plurality of communication apparatuses via the second wireless communication is disconnected, and a wireless connection is established with the one of the plurality of communication apparatuses via the first wireless communication.

16. The method according to claim 15, wherein a list of the data to be received is received through the wireless communication via the second wireless communication.

17. The method according to claim 13, wherein in a case where data to be received from the one of the plurality of communication apparatuses is completely received through the wireless communication via the second wireless communication, a notification is transmitted so that a recipient of the notification recognizes that a connection via the second wireless communication is allowed.

18. The method according to claim 11, further comprising performing third wireless communication to perform faster wireless communication than the wireless communication via the first wireless communication and the wireless communication via the second wireless communication,
wherein in a case where a wireless connection is established with one of the plurality of communication apparatuses via the third wireless communication, a notification is transmitted to a communication apparatus that has a wireless connection via the first wireless communication and has no wireless connection via the third wireless communication so that the communication apparatus receiving the notification recognizes that a connection via the second wireless communication is not allowed.

19. The method according to claim 18, wherein in a case where the wireless connection with the one of the plurality of communication apparatuses via the third wireless communication is to be disconnected, a notification is transmitted to a communication apparatus that has no wireless connection via the third wireless communication so that the communication apparatus receiving the notification recognizes that a connection via the second wireless communication is allowed.

20. A non-transitory computer-readable storage medium which stores a program for causing a computer to execute the method according to claim 11.

* * * * *